United States Patent [19]

Tasto et al.

[11] Patent Number: 4,817,117
[45] Date of Patent: Mar. 28, 1989

[54] METHOD OF AND CIRCUIT ARRANGEMENT FOR ENSURING BIT SYNCHRONIZATION OF A DATA BLOCK IN A RECEIVER

[75] Inventors: Manfred Tasto; Georg Ranner, both of Lauf/Pegnitz; Rainer Bläsius, Nürnberg/Boxdorf; Christian Behr, Nürnberg, all of Fed. Rep. of Germany

[73] Assignee: U.S. Philips Corporation, New York, N.Y.

[21] Appl. No.: 83,559

[22] Filed: Aug. 7, 1987

[30] Foreign Application Priority Data

Aug. 9, 1986 [DE] Fed. Rep. of Germany ....... 3627135

[51] Int. Cl.$^4$ ............................................. H04L 7/04
[52] U.S. Cl. ................................... 375/111; 375/113; 375/114
[58] Field of Search ............... 375/106, 111, 113, 114; 370/100, 106; 371/42, 46

[56] References Cited

U.S. PATENT DOCUMENTS

| | | | |
|---|---|---|---|
| 3,591,720 | 10/1969 | Othmer | 375/11 X |
| 4,312,074 | 1/1982 | Pautler et al. | 375/114 |
| 4,541,104 | 9/1985 | Hirosaki | 375/113 |
| 4,594,728 | 6/1986 | Niquel et al. | 375/116 |
| 4,663,765 | 5/1987 | Sutphin et al. | 375/114 |

Primary Examiner—Robert L. Griffin
Assistant Examiner—Stephen Chin
Attorney, Agent, or Firm—Thomas A. Briody; Jack E. Haken; Anne E. Barschall

[57] ABSTRACT

For synchronizing a data block in a receiver, there are transmitted consecutively and prior to the data block: a first bit sequence of alternating "0" and "1" levels for determining the bit clock and a second bit sequence for determining the block synchronization by correlation. In known methods of determining the bit clock, the phase range of the individual bits of the received digital signal is divided into sub-intervals and the phase position of the bit clock is determined on account of the number of edges in these sub-intervals. In order to avoid fading and phase jitter having a detrimental effect on the bit synchronism, more specifically when transmitting through radio transmission links, N-phase-shifted clocks having the same clock frequency are generated in the receiver by means of which the first bit sequence is sampled. The clock for which the number of sample-value changes of the first bit sequence is established as having a predeterminable minimum value during a predeterminable time-interval is utilized as the phase synchronous bit clock.

14 Claims, 3 Drawing Sheets

METHOD OF AND CIRCUIT ARRANGEMENT FOR ENSURING BIT SYNCHRONIZATION OF A DATA BLOCK IN A RECEIVER

BACKGROUND OF THE INVENTION

1. Field of the Invention

The invention relates to a method of ensuring synchronization of a data block in a receiver. In the method, a first bit sequence of alternating logic "0" and "1" levels is transmitted consecutively prior to the block. The first sequence is for determining the bit clock for the bits of the data block. A second bit sequence is also transmitted consecutively prior to the block. The second bit sequence is for determining synchronization of the block by correlation with a bit sequence stored in the receiver.

2. Prior Art

In digital information systems operating with blockwise transmission of information, the receiver has to be synchronized with the transmitter so that a common starting instant for the two arrangements is established. For synchronizing the receiver with the transmitter, a specific bit pattern can be produced in the transmitter and transmitted to the receiver. For establishing the starting instant the receiver derives a criterion by correlating the received data signal with a stored data signal.

If, as frequently happens with radio transmission links, interference in the transmission path causes bit errors that lead to relatively high bit error rates, the received bit pattern cannot always be recognized if one or more bits of the pattern are distorted on the transmission path.

Such a bit pattern preceding the data block proper is, for example, a first bit sequence of alternating half-bits for determining the bit clock for the bits of the data block and a second bit sequence for determining the block synchronization by correlation with the bit sequence stored in the receiver, as shown in U.S. Pat. No. 3,591,720.

The German Patent DE-PS No. 22 19 016 discloses a method of synchronizing the clock phase in a receiver to the phase position of the bit clock of a received data block; for simultaneously determining the bit clock and the block synchronization according to this method, the bit sequence is applied to N parallel-arranged correlators, whose associated shift registers are controlled by mutually offset shift-clock pulse sequences.

Recovering the bit clock and the block synchronization from the received data signal is hampered by the influence of noise voltages, transients and fading and the phase jitter resulting therefrom, so that the phase synchronization is relatively inaccurate or unattainable within a relatively short time interval. Furthermore, the circuit implementation is relatively complex owing to the correlator bank and, without further measures, it is not possible to determine the instant at which correlation signals have to be evaluated, for example for avoiding erroneous synchronization due to noise.

In addition, the published German Patent Application DE-OS No. 30 12 075 discloses a circuit arrangement for bit synchronization, in which also the bit clock is derived from the received data signal. For this purpose, the overall phase range of the individual bits (from 0 to 360 degrees) is divided into sub-intervals (so-called phase windows). During a measuring interval the number of occurrences of the instantaneous phase values assigned to sub-intervals are stored (by means of edge counters). The number of sub-intervals (phase windows) is determined by a divider circuit in combination with AND circuits. These circuits produce pulse sequences that are phase-shifted according to the reciprocal value of the number of different phase windows.

Counters are connected to the outputs of these circuits in order to count the number of edges of the received data signal that have fallen in the associated sub-interval (phase window). At the end of the measuring interval the phase of the bit clock is corrected by an estimated phase value corresponding to the phase value of the sub-interval having the largest number of edges.

For this purpose, a higher bit clock is supplied to the counters via a divider circuit and change-over switches at the end of the measuring interval, whereby the up-counting is accelerated. Owing to the phase-shifted pulse sequences there will always be only a single counter that reaches the maximum position, and by means of a subsequent code converter a binary number can be assigned to the counting position, which binary number is stored in a memory. Switching-over and reading-out the stored binary number that corresponds to the sub-interval having the largest number of edges and hence to the phase-synchronous bit clock, is controlled by a control logic and the received bit clock is corrected according to the estimated value of the phase.

Such a circuit arrangement has the disadvantage that as a consequence of the recovery of the bit clock from the received data signal the phase jitter of this data signal, i.e. the fluctuation of its significant instants around instants that are equidistant ideally, has its effects on the determination of the estimated value of the phase. More specifically, in radio transmission links frequent re-synchronization will be required as the bit error rate will assume inadmissibly high values as a result of fading.

SUMMARY OF THE INVENTION

The invention has for its object to provide a method of ensuring bit synchronization of a data block such that phase fluctuations do not affect the determination of the bit clock and the method can also be used for various modulation types of the data signals.

This object is achieved by a method in accordance with the invention having the features specified in the characterizing part of patent claim 1.

As compared with the methods known from the German Patent documents DE-PS No. 22 19 016 and DE-OS No. 30 12 075, the method according to the invention has the advantage that it is independent of the modulation method for the data signals. Compared with the circuit arrangement according to DE-OS No. 30 12 075, the circuit arrangement implementing the method in accordance with the invention requires only a low degree of circuit complexity. As the bit clock is obtained from a comparison of the first bit sequence with alternating sample values of a predeterminable minimum number during a predeterminable time interval, fluctuations resulting from phase jitter hardly have an effect on the determination of the bit clock. During the comparison process, a shift of the predeterminable time interval (time window) can be made, so that a short clock drop-out does not entail an interrupt of the synchronization process.

In comparison with the method known from DE-PS No. 22 19 016, the method in accordance with the invention has the advantage that on the basis of the determined bit clock the bit synchronization can subsequently be checked with a second bit sequence for determining the block synchronization.

The method as claimed in patent claim 2 has the advantage that due to the determination of the mean phase value it is possible to perform a shift of the sampling instant to the centre position between the edges of the data block bits.

The circuit arrangement as claimed in patent claim 3 for implementing the method requires only a low degree of circuit complexity and can be integrated in a simple way and manner.

BRIEF DESCRIPTION OF THE DRAWINGS

The invention will be further described hereinafter with reference to the embodiment of the invention shown in the drawing in which:

FIG. 4 shows a cordless telephone set, including a base station and associated mobile station, with which the present invention may be used.

DETAILED DESCRIPTION OF THE PREFERRED EMBODIMENT

Figure 1:
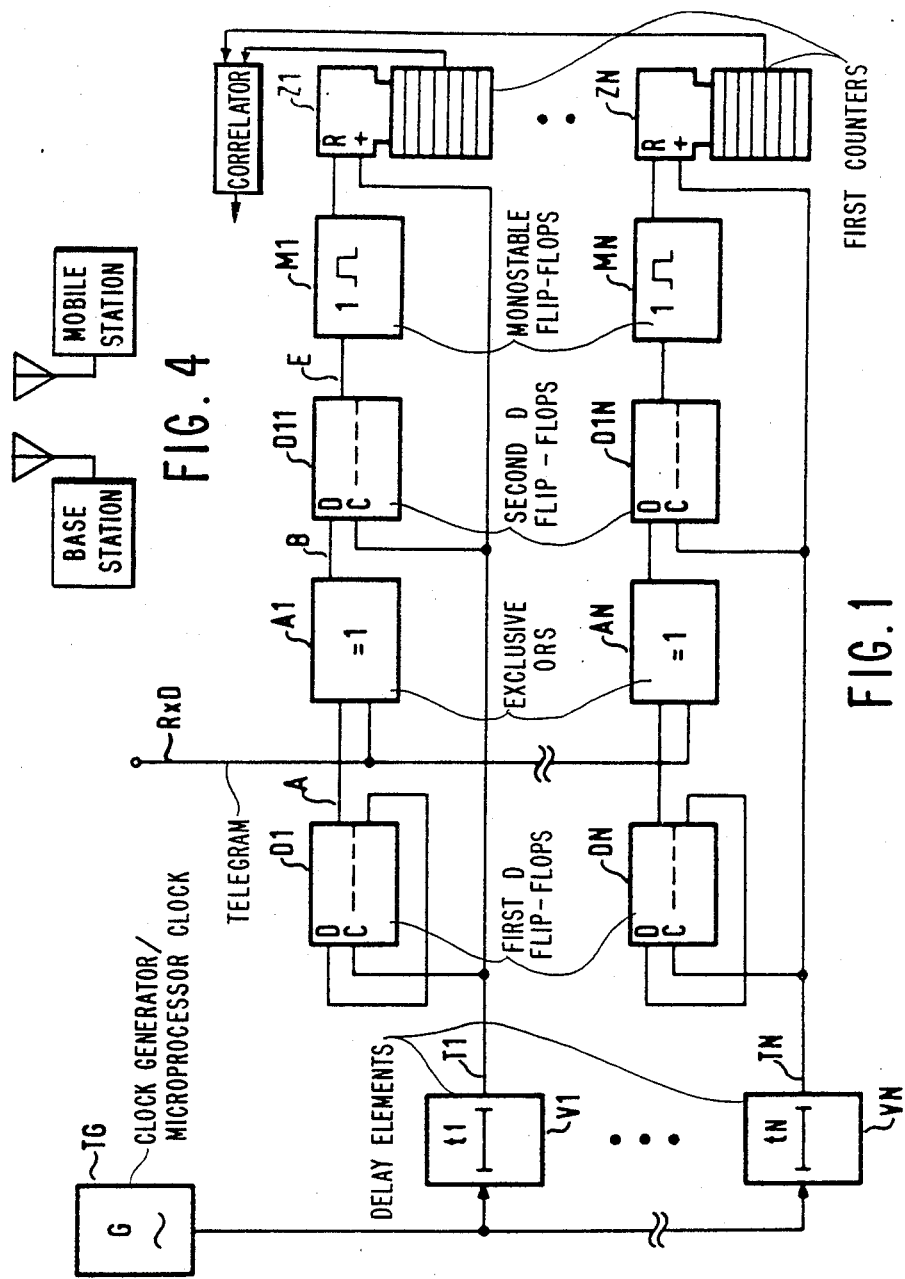
FIG. 1 shows an embodiment of a circuit for implementing the method in accordance with the invention.

The method according to the invention is described and explained for the case that it is used in a cordless telephone set. In cordless telephone sets, the transmission of information between a base station and the associated mobile station is effected through a radio channel, as shown in FIG. 4. The base station is connected to a public office line or to a private branch exchange by means of a connector box, so that the customer is given access to the public telephone network. Owing to the fact that the base station and the mobile station are interconnected through a radio channel, the user's range of free movement with respect to the fixed connector box in question is increased by approximately 200 meters.

In the Federal Republic of Germany 40 radio channels are available for the transmission of information, which channels are situated in the frequency range of 900 MHz. If one wishes to set up a connection, a search for an idle radio transmission channel is started ad the channel is seized. In the mobile station, the search for a radio channel is initiated by operating the cradle-switch. In order to ensure that messages to be transmitted between the mobile station and the base station cannot be overheard by any other adjacent cordless telephone set and/or to guarantee the allocation of charges, the two stations each have a code arrangement, in which the code in the mobile station and the base station is set-bound and independent of the subscriber's number of the telephone user. During the search for an idle radio channel and the subsequent setting up on a radio connection identification numbers are exchanges between the two stations.

When a connection is set up, one of the two stations seizes a radio transmission channel that is found to be idle, activates the transmitter and transmits its identification number as a data telegram through this radio transmission channel. After each transmission of such a data telegram an acknowledgement telegram from the associated opposite station is waited for. The called station scans all radio transmission channels for data telegrams and sends back an acknowledgement telegram to the calling station when a data telegram containing an identification number is received which is identical to its assigned identification number.

The above telegrams contain various bit sequences which are transmitted consecutively. A first bit sequence of alternating half bits consists of, for example, 16 bits and is used for determining the bit clock in the stations. Subsequently, a second bit sequence for achieving block synchronization is transmitted, which second sequence is, for example, 8 bits long and has the channel number as its information content. By using the channel number for block synchronization, the beginning of the subsequent data block is recognized and, on the other hand, it is avoided that in the case of favourable field strength conditions the receiving station locks on to an adjacent channel having an adequate field strength level. The data block comprises, for example, 20 bits and contains, for example, the identification number during the setting up of the radio connection. A check sequence of 12 bits can further be added to this data block, which sequence is used for detecting and correcting bit errors within the useful information, for which purpose, e.g. a matrix-parity-check method can be used for the 12 bits of the check sequence.

During the conversation an inaudible exchange of identification numbers between the two stations can take place, in which the telegram is transmitted as inaudible out-of-band signalling. Because the data telegram, as already mentioned, contains the first bit sequence, bit synchronization is ensured during the conversation too.

The bit synchronization can also be effected by means of a program-controlled control arrangement provided both in the base station and in the mobile station of the cordless telephone set.

The method according to the invention will be further described with reference to the embodiment of a control arrangement shown in FIG. 1, in which components of the two stations that are not essential for comprehending the invention have not been shown.

The clock of a clock generator TG is applied to N parallel-arranged delay elements V1, ..., VN. For the clock generation, it is also possible to utilize the internal clock of a microprocessor that is arranged in the two stations. The output of each delay element V1, ..., VN is connected to the clock input of a first D flip-flop D1, ..., DN. The data input of each of these first D flip-flops D1, ..., DN is connected to the inverting output. The non-inverting output of each first D flip-flop D1, ..., Dn is connected to a first input of an Exclusive-OR circuit A1, ..., AN. The telegram (RxD) is applied to the second input of each Exclusive-OR circuit A1, ..., AN. The output of each Exclusive-OR circuit A1, ..., AN is connected to the data input of a second D flip-flop D11, ..., D1N, whose clock input is connected to the output of the respective delay element V1, ..., VN. The output of each second D flip-flop D11, ..., D1N is connected to both the inverting input and the noninverting input of a mono-stable flip-flop M1, ..., MN. The output of each mono-stable flip-flop M1, ..., MN is connected to the reset input of a first counter Z1, ..., Zn. The clock input of each counter Z1, ..., Zn is connected to the output of its associated delay element V1, ..., VN.

Figure 2:
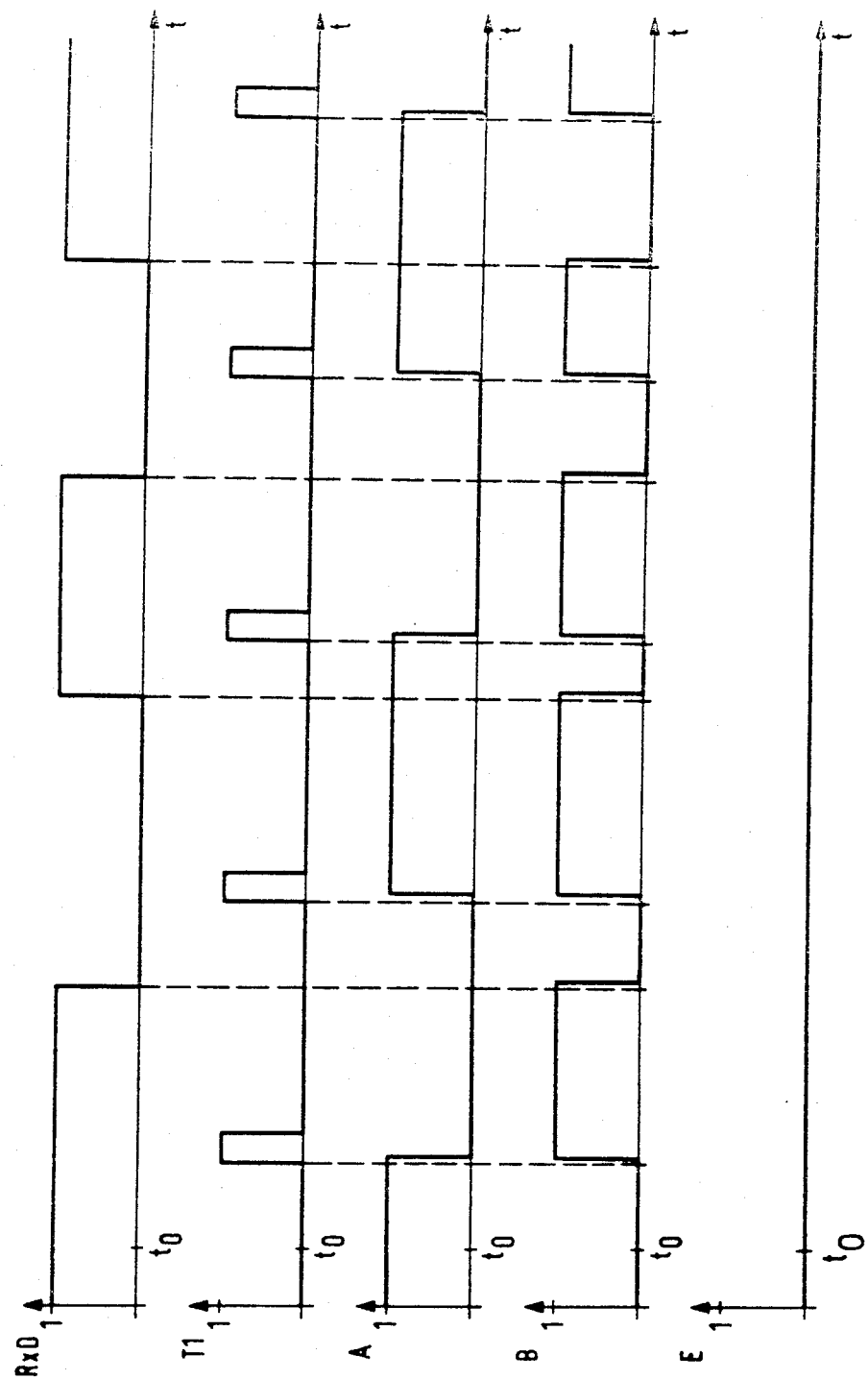
FIG. 2 shows time diagrams of signals in the embodiment of FIG. 1 in the case of undisturbed synchronization.

The operation of the circuit arrangement according to FIG. 1 is further described hereinafter with reference to the time diagrams shown in FIG. 2. At instant $t_0$ each one of the first D flip-flops D1, ..., Dn is in its "1" state. The first D flip-flops D1, ..., DN effect a frequency division in the ratio of 1:2 of the phase-shifted clock T1, ..., TN available at the output of the delay elements V1, ..., VN. The signal A at the output of the first D flip-flop D1, ..., Dn gives the expected state of the digital signal RxD.

In the Exclusive-OR circuits A1, ..., AN, this expected state as given by the signal A is compared to the actual state of the digital signal RxD and the signal B at the output of the Exclusive-OR circuit A1, ..., AN is in its "1" state only if one of the respective two signals A and RxD is detected as being in the "1" state.

By means of the second D flip-flop D11, ..., D1N the result of this comparison is stored at the edgeinstant of the clock signal T at the output of the delay elements V1, ..., Vn. If the signal E at the output of the second D flip-flops D11, ..., D1N has a constant significant state during the predeterminable time interval (measuring interval), the monostable flip-flop M1, ..., MN is not triggered and the counter Z1, ..., Zn counts up.

As the synchronizing bits (first bit sequence) have a transition in the centre of the bit interval, a certain number of "1"-samples and "0"-samples will occur during the sampling of the first bit sequence irrespective of the phase position of the sampling pulse of the clock T1, ..., TN. The number of respective sample-changes is counted by the counters Z1, ..., ZN and as soon as one of these counters Z1, ..., ZN indicates the predeterminable minimum number, this clock is utilized as the phase-synchronous clock.

If, for example, the first bit sequence is sampled by means of three phase-shifted clocks T1, ..., T3 of equal clock frequency, and if the phase position of one clock coincides with transition edge in the centre of the synchronizing bit, this clock will not satisfy the requirement of the alternating "0" and "1" levels and will therefore not be utilized as the phase synchronous bit clock. On the other hand, the two remaining clocks are situated at a distance of 60° to the central transition edge of the synchronizing bit, so that one of the two clocks can be utilized as a phase-synchronous bit clock.

If one of the counters Z1, ..., ZN reaches the predeterminable minimum value, the actual counting positions of the other counters can be checked. If three counters Z1, Z2, Z3 are used different cases may arise.

On the basis of the actual counting positions it can be assumed that a short time afterwards the two other counters will exceed the predeterminable minimum value so that each of the three clocks can be utilized as the phase-synchronous bit clock. A further improvement of the phase position can be achieved without modifying the method in accordance with the invention.

If only one counter is expected to reach the predeterminable minimum value a short time afterwards, the mean phase value of the two clocks can be determined from the clock phases for improving the phase position, and the clock having the mean phase value can be utilized as the phase-synchronous bit clock. If it is to be expected that neither of the two counters reaches the predeterminable minimum value, the bit clock assigned to the first counter will be utilized as the phase-synchronous bit clock.

If, for example, the number of synchronizing bits is 16, the minimum number of the alternating "0" and "1" levels occurring in an uninterrupted sequence can be set at 25.

Figure 3:
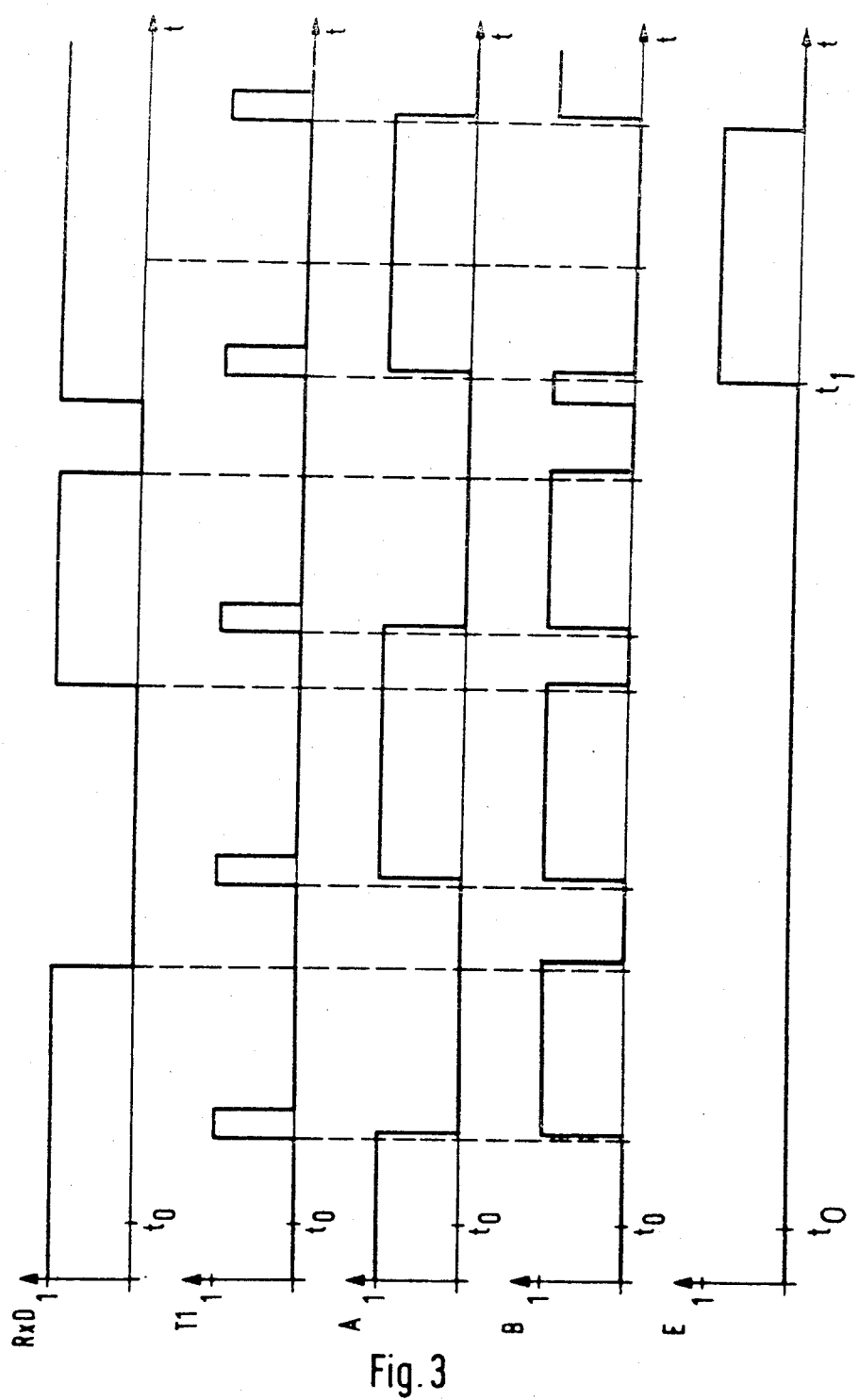
FIG. 3 shows time diagrams of signals in the embodiment of FIG. 1 in the case of a disturbed synchronization process.

FIG. 3 shows the synchronizing process in the case of a disturbance. At instant $t_1$ a disturbance occurs to the effect that the "expected" signal A and the received signal RxD have different significant states. The signal E changes to the "1"-state, triggering, for example, the monostable flip-flop M1 and resetting the counter Z1. If the counter Z1 reaches the predeterminable counting position during the measuring interval, the bit clock assigned to the counter Z1 can be utilized as the phase-synchronous bit clock inspite of the disturbance.

The synchronizing method according to the invention can also be used in the case when the significant states of the "expected" signal A and the received digital signal RxD are always unequal during the predeterminable time interval (measuring interval).

If the clock is derived from the internal clock of a microprocessor (program-controlled control arrangement) the minimal spacing of consecutive interrupts for 32 clock cycles of 2.5 $\mu s$ each amounts to 80 $\mu s$ when using a 6 MHz quartz crystal. This interrupt spacing of 80 $\mu s$ is increased to double its length for reasons of processing and this clock is utilized for sampling the telegram. In order to achieve a subdivision of the phase range in a phase interval (sub-interval) of 60 degrees, at least 3 clocks are required that are distributed evenly over the phase range of the bits. The bit length of the synchronizing bits in this case is 960 $\mu s$.

What is claimed is:

1. A method of determining a bit clock in a data receiver from a first bit sequence of alternating half-bits received from a data transmitter comprising:
   generating a local clock signal;
   generating a plurality of phase shifted local clock signals of equal frequency and from said local clock signal;
   generating a bit clock signal from at least one of said plurality of phase shifted local clock signals when the first bit sequence is detectable with the at least one clock signal for a predetermined minimum number of clock intervals of the at least one clock signal during a predetermined time interval.

2. The method of claim 1 further comprising synchronizing a data block transmitted by said data transmitter with a second bit sequence transmitted after said first bit sequence and before said data block comprising:
   correlating, under control of said bit clock, said second bit sequence with a third bit sequence stored in the receiver.

3. A circuit for generating a local phase tolerant bit clock in a data receiver, from an alternating first bit sequence received from a data transmitter comprising:
   a clock generator;
   a plurality of delay means each having a clock input connected to said clock generator and a clock output;
   means for sampling said alternating first bit sequence with each said clock output to generate a sample value; and
   means for generating a bit clock from at least one clock output for which the number of sample value changes during a predetermined time period is less than a predetermined minimum value.

4. The circuit of claim 3 further comprising means for determining the mean phase of at least two clock outputs having an equal number of sample value changes in said predetermined period and generating said bit clock from the clock output characterized by said mean phase.

5. A method of ensuring bit synchronization of a data block transmitted to a receiver, comprising the steps of:
   a. transmitting, prior to transmission of the data block, first and second bit sequences, the first bit sequence alternating between a first logic state and a second logic state;
   b. determining, in the receiver, a bit clock of the data block from the first bit sequence, including the steps of:
      i. sampling the first bit sequence with N phase-shifted clocks of equal clock frequency, whereby an overall phase range of individual bit intervals of the first bit sequence is divided into subintervals; and
      ii. deriving a phase-synchronous bit clock from at least one of the N phase-shifted clocks, when the first bit sequence is detectable with the at least one clock for a predetermined minimum number of clock intervals of the at least one clock during a predetermined time interval; and
   c. correlating, in the receiver, the second bit sequence with a third bit sequence stored in the receiver, in order to locate a beginning of the data block.

6. The method of claim 5 wherein the determining step comprises the step of identifying a mean phase value of a plurality of the N phase-shifted clocks with which the first bit sequence is detectable for the predetermined minimum number of clock intervals during the predetermined time interval, a clock having the mean phase value being used in the deriving step to derive the phase-synchronous bit clock.

7. The method of claim 5 comprising transmitting the data block and the first and second bit sequences as an inaudible exchange of identification numbers during a conversation between two stations.

8. A circuit for ensuring bit synchronization of a data block received by a receiver, the data block including a first bit sequence of alternating first and second logic levels for determining a bit clock for bits of the data block, the data block also including a second bit sequence for correlating with a third bit sequence stored in the receiver, the circuit comprising:
   a. a clock generator;
   b. a plurality of parallel delay elements, each having a clock input coupled to the clock generator and an output;
   c. a first plurality of D flip-flops, each having a respective clock input coupled to the output of a respective one of the delay elements, and each having a data input, an inverting output coupled to the data input, and a non-inverting output;
   d. a plurality of exclusive OR gates each having first and second inputs and an output, the respective first inputs each being coupled to the non-inverting output of a respective one of the first D flip-flops, the respective second inputs being coupled to receive a digital signal portion of the received data;
   e. a second plurality of D flip-flops, each having a data input coupled to the output of a respective one of the exclusive OR gates, a clock input coupled to the output of a respective one of the delay elements, and an output;
   f. a plurality of monostable flip-flops, each having an output and an input coupled to the output of a respective one of the second D flip-flops;
   g. a plurality of counters, each having a reset input coupled to the output of a respective one of the monostable flip-flops, a clock input coupled to the output of a respective one of the delay elements, and an output; and
   h. means for establishing a phase synchronous bit clock from signals present at the outputs of the counters.

9. The circuit of claim 8 wherein the means for establishing comprises a plurality of means disposed within the respective counters for providing a clock signal at the respective outputs of the respective counters when a predetermined respective minimum count is reached.

10. The circuit of claim 8 wherein the second and third bit sequences are both a channel number, whereby the second bit sequence is usable to locate the beginning of the data block in an appropriate channel corresponding to the channel number.

11. The circuit of claim 8 wherein the data block comprises twenty bits and contains an identification number for establishing a radio connection.

12. The circuit of claim 10 wherein the data block comprises an additional twelve bits used as a check sequence is a matrix-parity-check method.

13. A cordless telephone set comprising a base station and a mobile station, both the base station and the mobile station comprising a circuit for ensuring bit synchronization of a data block, the data block being preceded by a first and second bit sequences, the first bit sequence being of alternating first and second logic levels for determining a bit clock for bits of the data block, the second bit sequence being for correlating with a third bit sequence stored in the base and mobile stations, the circuit comprising:
   a. a clock generator;
   b. a plurality of parallel delay elements, each having a clock input coupled to the clock generator and an output;
   c. a first plurality of D flip-flops, each having a respective clock input coupled to the output of a respective one of the delay elements, and each having a data input, an inverting output coupled to the data input, and a non-inverting output;
   d. a plurality of exclusive OR gates each having first and second inputs and an output, the respective first inputs each being coupled to the non-inverting output of a respective one of the first D flip-flops, the respective second inputs being coupled to receive a digital signal portion of the received data;
   e. a second plurality of D flip-flops, each having a data input coupled to the output of a respective one of the exclusive OR gates, a clock input coupled to the output of a respective one of the delay elements, and an output;
   f. a plurality of monostable flip-flops, each having an output and an input coupled to the output of a respective one of the the second D flip-flops;
   g. a plurality of counters, each having a reset input coupled to the output of a respective one of the monostable flip-flops, a clock input coupled to the output of a respective one of the delay elements, and an output; and
   h. means for establishing a phase synchronous bit clock from signals present at the outputs of the counters.

14. The cordless telephone set of claim 12 wherein the respective clock generators are respective internal clocks of respective microprocessors disposed within the base and mobile stations.

* * * * *